United States Patent [19]

Lipschutz

[11] 3,880,448
[45] Apr. 29, 1975

[54] SAFETY BELTS WITH DECELERATION RELEASE CONTROL

[75] Inventor: Paul Lipschutz, Neuilly-sur-Seine, France

[73] Assignee: Societe d'Exploitation des Brevets Neiman, Neuilly-sur-Seine (Hauts de Seine), France

[22] Filed: Nov. 14, 1972

[21] Appl. No.: 306,408

Related U.S. Application Data

[62] Division of Ser. No. 47,322, June 18, 1970.

[30] Foreign Application Priority Data

June 20, 1969 France .............................. 69.20632

[52] U.S. Cl........................................... 280/150 SB
[51] Int. Cl. .............................................. B60r 21/10
[58] Field of Search ............. 280/150 SB; 180/82 C; 297/388

[56] References Cited
UNITED STATES PATENTS 3,419,308   12/1968   Apri .................. 280/150 SB
3,610,361   10/1971   Pringle .............. 280/150 SB

*Primary Examiner*—Robert R. Song
*Attorney, Agent, or Firm*—Stevens, Davis, Miller & Mosher

[57] ABSTRACT

In a safety belt, the belt anchorage after the webbing has been duly fitted around the user's body leaves a certain freedom of movement to the user until the driver depresses the brake pedal, thus causing the selected power means, whether of electrical, pneumatic, hydraulic or mechanical character, to cause the positive engagement of a pawl associated with one end of the webbing into a perforation formed in a member associated with the other end of the webbing, so as to lock the webbing around the user's body on this side of the amplitude allowed by the initial resilient anchorage.

4 Claims, 7 Drawing Figures

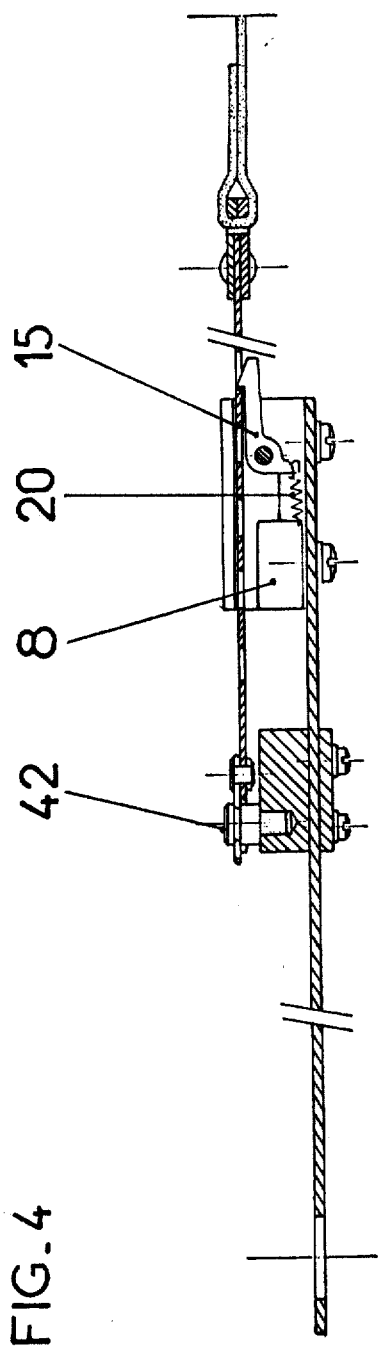
FIG._4
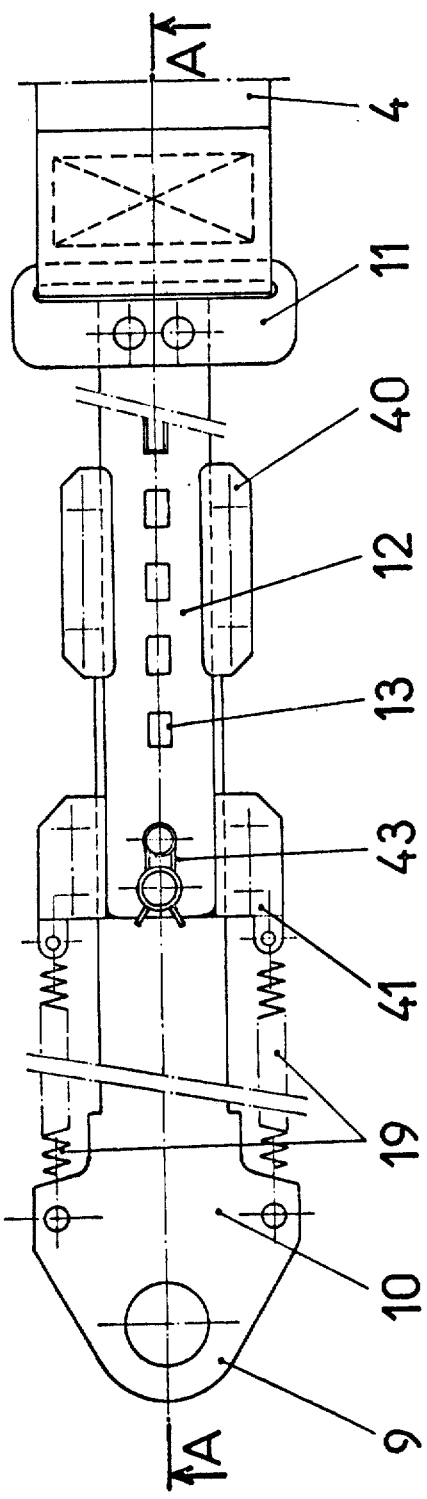
FIG._5

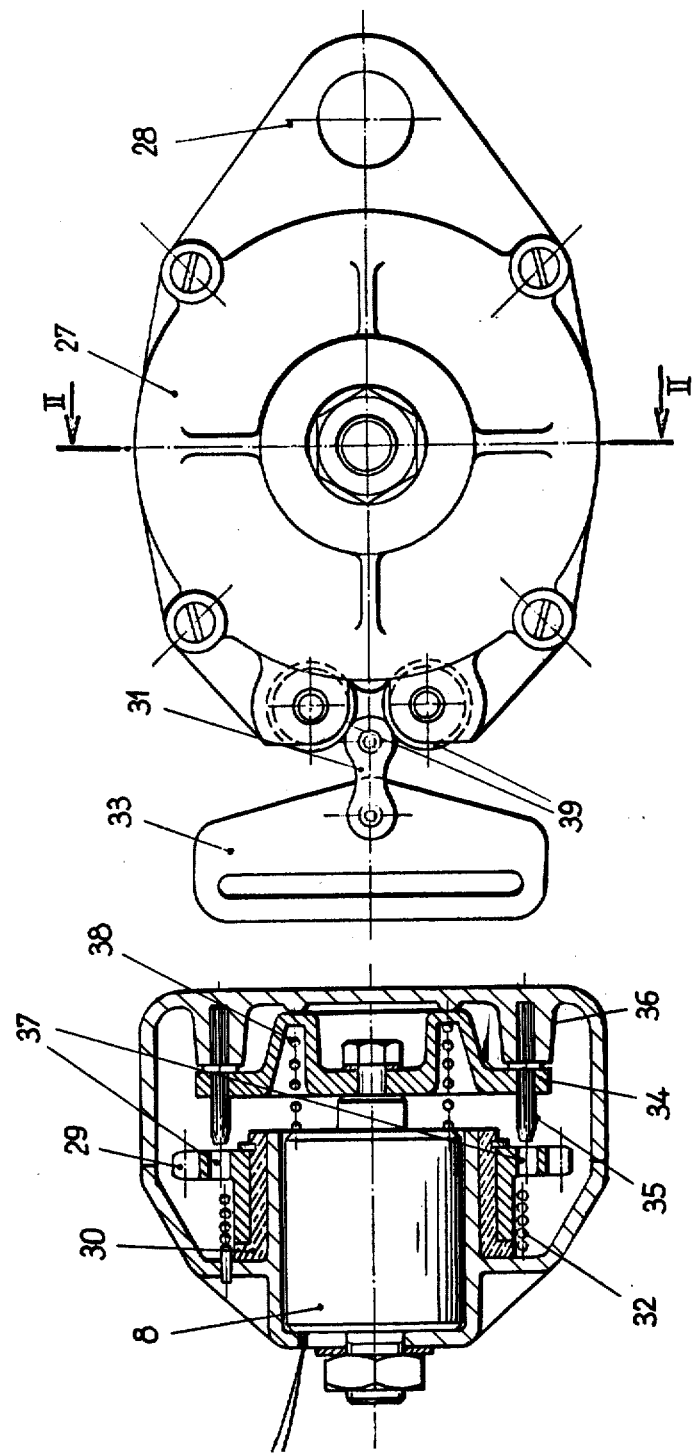

3,880,448

SAFETY BELTS WITH DECELERATION RELEASE CONTROL

This is a division of application Ser. No. 47,322, filed June 18, 1970.

Many types of safety belts for drivers and passengers of automotive vehicles are now available on the market; they differ mainly by the design of the anchorage system.

Most types have a major inconvenience, in that the user of the belt is "trapped" therein and firmly attached to his seat, so that he cannot move freely and must make a sometime awkward control action for releasing the belt. In certain cases, the user cannot perform this necessary control movement due to a material impossibility.

It is the object of the present invention to provide a safety belt for automotive drivers and passengers which eliminates these inconveniences.

The Applicant's invention was based on the following observations:

a. The user must constantly be free in his movements except in case of sudden deceleration, that is, in case of sudden brake application, or in case of a risk of accident or front crash;

b. When a danger arises, the driver of a vehicle, whether by instinct or automatically, depresses the brake pedal. Therefore a relationship between the braking action and the efficiency of the safety belt may exist.

In view of the foregoing, the present invention is characterized by the fact that a positive locking of the belt takes place only each time the brake pedal is depressed; otherwise, the belt is relatively "free" under all other circumstances.

The attached drawing given by way of illustration, not of limitation, will afford a clearer understanding of this invention and of the manner in which the same may be carried out in practice. In the drawing:

FIG. 4 is a different form of embodiment shown in section taken along the line AA of FIG. 5;

FIG. 5 is a plane view from above of the same form of embodiment;

FIG. 6 is a cross section taken along the line AA of FIG. 7 concerning a third form of embodiment, and FIG. 7 is a plane view from above of this third form of embodiment.

Figure 1:
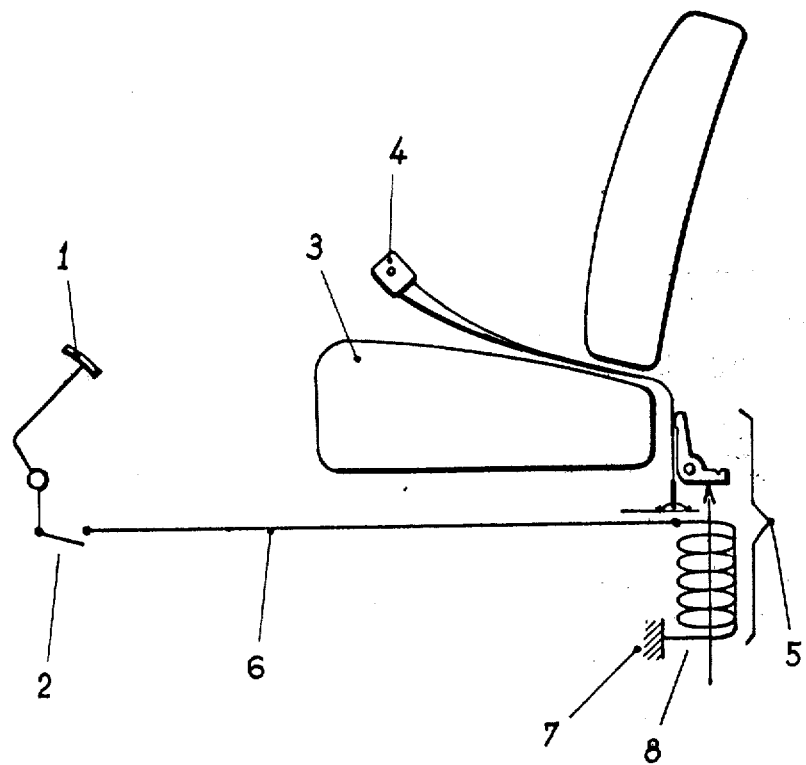
FIG. 1 illustrates diagrammatically in side elevational view the relative arrangement of the component elements of the device.

The general principle of the invention is illustrated diagrammatically in FIG. 1 in which the brake pedal 1 is adapted to actuate a switch 2; on the other hand, the seat 3 is equipped with a belt webbing 4 anchored to the device 5 electrically connected in turn to said switch 2 via a wire 6 and grounded at 7 via a solenoid 8.

Figure 2:
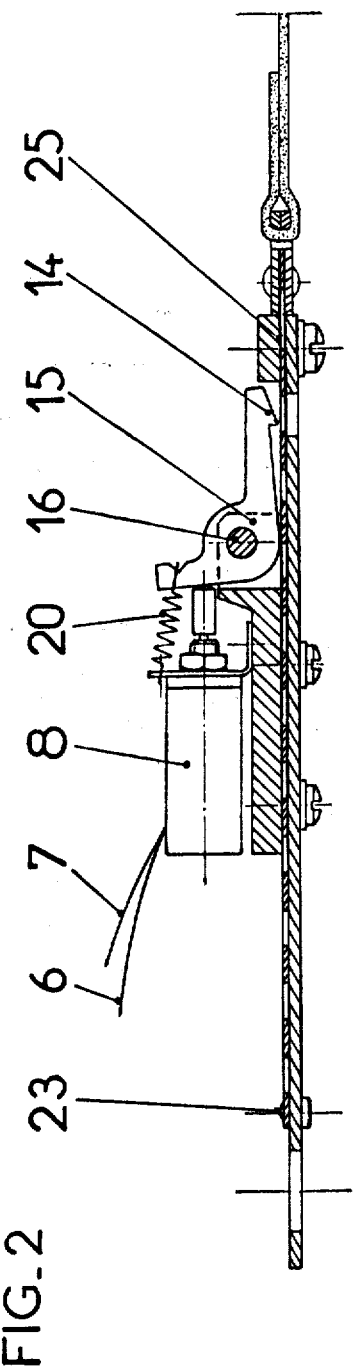
FIG. 2 illustrates in longitudinal section the device of FIG. 3, the section being taken along the line II—II thereof.
Figure 3:
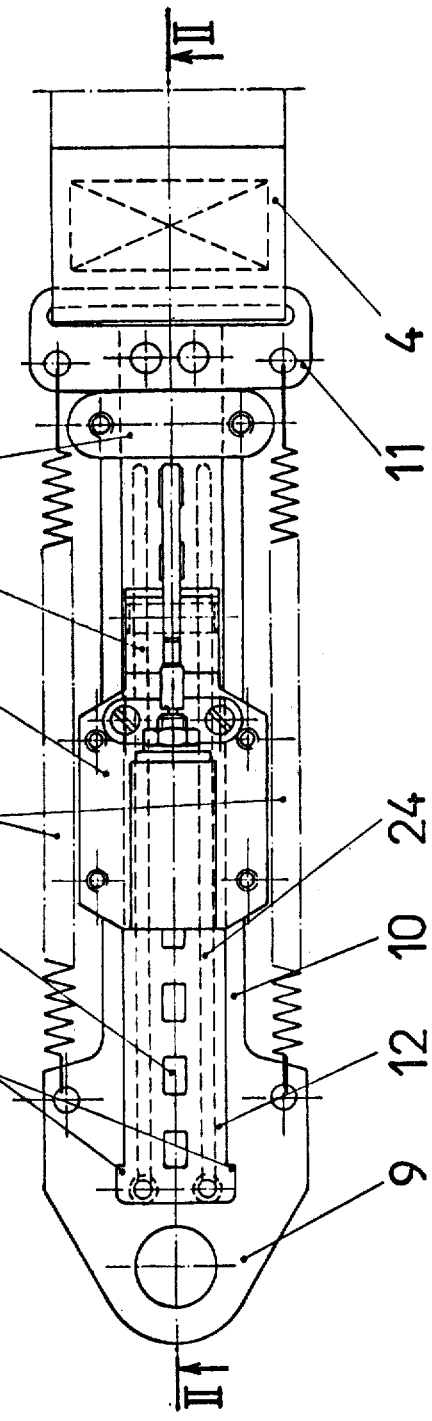
FIG. 3 is a plane view from above of this device.

Referring now to FIGS. 2 and 3, it will be seen that the end 9 of a base plate 10 is secured to the floor (not shown) of the vehicle (or to any other suitable point of anchorage of safety belts or harnesses), the assembly comprising a fastener 11 of a sliding blade 12 to which the belt proper 4 is secured.

The base plate 10 has two parallel grooves 24 in which are engaged pins 23 of the slide blade 12 to guide it when sliding on plate 10.

This blade 12 has a row of perforations 13 formed therethrough which are engageable by a hook-shaped end 14 of a pawl 15 fulcrumed about a pivot pin 16 mounted in a strap 17 of a support or bracket 18 rigid with said base plate 10.

When a tractive effort is exerted on the belt 4 the blade 12 is caused to slide at will (until the two lateral projections 21 of blade 12 engage the stop plate 22). Due to this relatively ample permissible movement the user has a complete ease of movement. When the user is in a normal position on his seat the assembly is constantly urged to its initial position (as illustrated in FIGS. 2 and 3) by resilient or mechanical return means such as tension springs 19. Now let us assume that the driver actuates even very slightly the braking system of the vehicle: depressing the brake pedal 1 will close switch 2 and energize the solenoid 8 which, by rotating the pawl 15 in the clockwise direction as seen in FIG. 2 causes the hook-shaped pawl end 14 to engage one of the perforations 13, thus positively locking the belt 4 in relation to the fixed base plate 10. When the brake pedal 1 is released, the switch 2 is opened, thus discontinuing the energization of solenoid 8 and therefore its action on pawl 15 which is then returned to its inoperative position by a return spring 20 to release the blade 12.

FIGS. 4 and 5 illustrate another form of embodiment of this invention.

A fixed guide block 40 is rigidly secured to the base plate 10 and acts both as a guide to the movable blade 12 and as a support to the solenoid 8. Another block 41 adapted to slide along the fixed base plate 10 is temporarily locked in relation to said movable blade 12 by means of a transverse pin 42 force-fitted in said block 41 and also to a clip 43 carried by the movable blade 12. The operation is the same as that of the preceding form of embodiment, the only difference residing in the method of assembling the fixed portion with the movable portion of the device which, in this second example, can be released completely from the fixed portion. The assembly comprising the solenoid 8, pawl 15 and return spring 20 have the same functions as in the preceding form of embodiment. The device comprises likewise a fixed base plate 10, a movable blade 12 formed with perforations 13, and a belt fastener 11.

When the belt webbing 4 is pulled the movable blade 12 and block 41 are carried along and the latter slides on the fixed blade 10 until it engages the fixed block 40.

Further pulling the belt webbing 4 will cause the clip 43 to be released from pin 42, thus producing a complete release of the user's body without any intervention whatsoever from the user himself.

To reset the device, it is only necessary to re-engage the clip 43 on pin 42.

FIGS. 6 and 7 illustrate a third form of embodiment of this invention wherein a solenoid 8 has its winding electrically connected to the brake pedal 1 through a switch 2 as explained in connection with the first form of embodiment. The assembly is enclosed in two casing halves 27 comprising on one side a fastening lug 28 for anchoring the device to the vehicle structure. This casing 27 has mounted therein on the one side a pinion 29 revolving on a bearing 30 secured to the casing 27, a chain 31 having one end anchored to said pinion 29, a return spring 32 secured to the casing at one end and to the pinion at the opposite end in order to rewind the chain 31 on said pinion 29. The chain 31 carries at said opposite end an anchoring lug 33 for securing the belt 4 thereto. Two rollers 39 are provided for guiding the chain 31 at the casing outlet.

On the other hand, a plate 34 has force fitted therein, a pair of studs 35 adapted to be guided in two holes 36 formed in said casing 27 in order to hold the plate 34 against rotation. Thus, during a brake application the solenoid 8 is energized and attracts the plate 34 with the two studs 35, said studs engaging registering holes 37 formed in said pinion 29 and locking same against rotation; at the same time, the belt 4 is positively locked. When the brake pedal 1 (FIG. 1) is released, the switch 2 is opened and the solenoid 9 is deenergized, whereby the assembly comprising the plate 34 and the pair of studs 35 resume their initial positions as shown in FIG. 6, due to the resilient action of a return coil spring 38, whereby pinion 29 and chain 31 are released. Thus, the driver has again a great freedom of movement.

The solenoid or electromagnet control of these various devices may be replaced if desired by mechanical, pneumatic, hydraulic or other control systems.

Of course, the various forms of embodiment described hereinabove should not be construed as limiting the scope of the invention since many modifications may be brought thereto without departing from the basic principles of the invention as set forth in the appended claims.

What is claimed as new is:

1. A safety belt anchoring device for use with safety belts for passengers in vehicles comprising: a seat belt webbing, a fastener for anchoring a belt end and a base plate one end of which is adapted for anchoring the belt end to a point in a vehicle; slide means fixed to said fastener and movable on said base plate for moving said fastener, and means in said base plate for guiding said slide means when moving along said base plate; resilient reaction springs for connecting said belt fastener to said one end of the base plate and permitting a certain amplitude of free movements by the passenger; a pivoting pawl fixed on said base plate and having a hook portion for locking said slide means by engaging said hook in perforations in said slide means; control means for activating said pawl for locking said slide means in response to a sudden deceleration of the vehicle, and resilient means for returning said pawl to its normal position wherein said slide means is unlocked.

2. A safety belt anchoring device according to claim 1, wherein said means for guiding said slide means comprises the faces of said base plate.

3. A safety belt anchoring device according to claim 1, wherein said control means for activating said pawl comprises an electromagnet having a solenoid energized by an electrical system for activation upon sudden deceleration of a vehicle, said electromagnet having a movable core connected to said pawl for pivoting said pawl for locking said slide means.

4. A safety belt anchoring device according to claim 1, wherein said control means includes an inertia switch for energizing said control means upon a sudden deceleration of a vehicle.

* * * * *